United States Patent
Weiler et al.

(10) Patent No.: US 6,179,095 B1
(45) Date of Patent: Jan. 30, 2001

(54) SPRING ASSEMBLY FOR A FLOATING CALLIPER DISC BRAKE

(75) Inventors: Rolf Weiler, Eppstein; Thomas Kirschner; Winfried Gerhardt, both of Frankfurt, all of (DE)

(73) Assignee: Continental Teves AG & Co., OHG (DE)

(*) Notice: Under 35 U.S.C. 154(b), the term of this patent shall be extended for 0 days.

(21) Appl. No.: 09/214,282
(22) PCT Filed: Jun. 13, 1997
(86) PCT No.: PCT/EP97/03090
§ 371 Date: Jun. 21, 1999
§ 102(e) Date: Jun. 21, 1999
(87) PCT Pub. No.: WO98/00647
PCT Pub. Date: Jan. 8, 1998

(30) Foreign Application Priority Data

Jul. 1, 1996 (DE) .............................................. 196 26 299

(51) Int. Cl.⁷ .................................................. F16D 65/40
(52) U.S. Cl. ........................................ 188/73.38; 188/72.3
(58) Field of Search ............................... 188/72.3, 73.38, 188/73.37, 73.36, 73.35, 73.43, 73.44, 73.45

(56) References Cited

U.S. PATENT DOCUMENTS

| | | | |
|---|---|---|---|
| 4,394,891 | * 7/1983 | Oshima | 188/73.38 |
| 4,487,296 | * 12/1984 | Schreiner et al. | 188/73.38 |
| 4,881,623 | * 11/1989 | Kondo | 188/73.38 |
| 4,901,825 | * 2/1990 | Weiler | 188/73.35 |

FOREIGN PATENT DOCUMENTS

| | | |
|---|---|---|
| 33 36 302 | 4/1985 | (DE) . |
| 39 21 346 | 1/1991 | (DE) . |
| 40 24 484 | 2/1992 | (DE) . |
| 43 29 904 | 3/1995 | (DE) . |
| 43 31 633 | 3/1995 | (DE) . |

OTHER PUBLICATIONS

German Search Report for German Appl. No. 196 26 299.2.

* cited by examiner

*Primary Examiner*—Robert J Oberleitner
*Assistant Examiner*—Melanie Talavera
(74) *Attorney, Agent, or Firm*—Rader, Fishman & Grauer PLLC

(57) ABSTRACT

The invention involves a spring for a floating caliper disc brake with a frame jaw caliper which, in the middle section of its axial outer edge, has a side window and on both sides of this window openings for an axial bracket of a fixed brake anchor plate. The caliper is displaceably and axially mounted on the bracket of the brake anchor plate. Brake linings are attached on both sides of the disc brake to the bracket of the brake anchor plate in an axial, displaceable manner and are also overlapped by the frame jaw caliper. The invention includes a onepiece curved wire holding spring, the middle section of which is releasably attached to the axial outer brake lining and which has two springs arms that are essentially placed in a contrary tangential direction to the middle section. The holding spring biases the frame jaw caliper radially against the brake anchor plate and biases the axial outer brake lining axially against the inside of the outer edge of the frame jaw caliper.

9 Claims, 3 Drawing Sheets

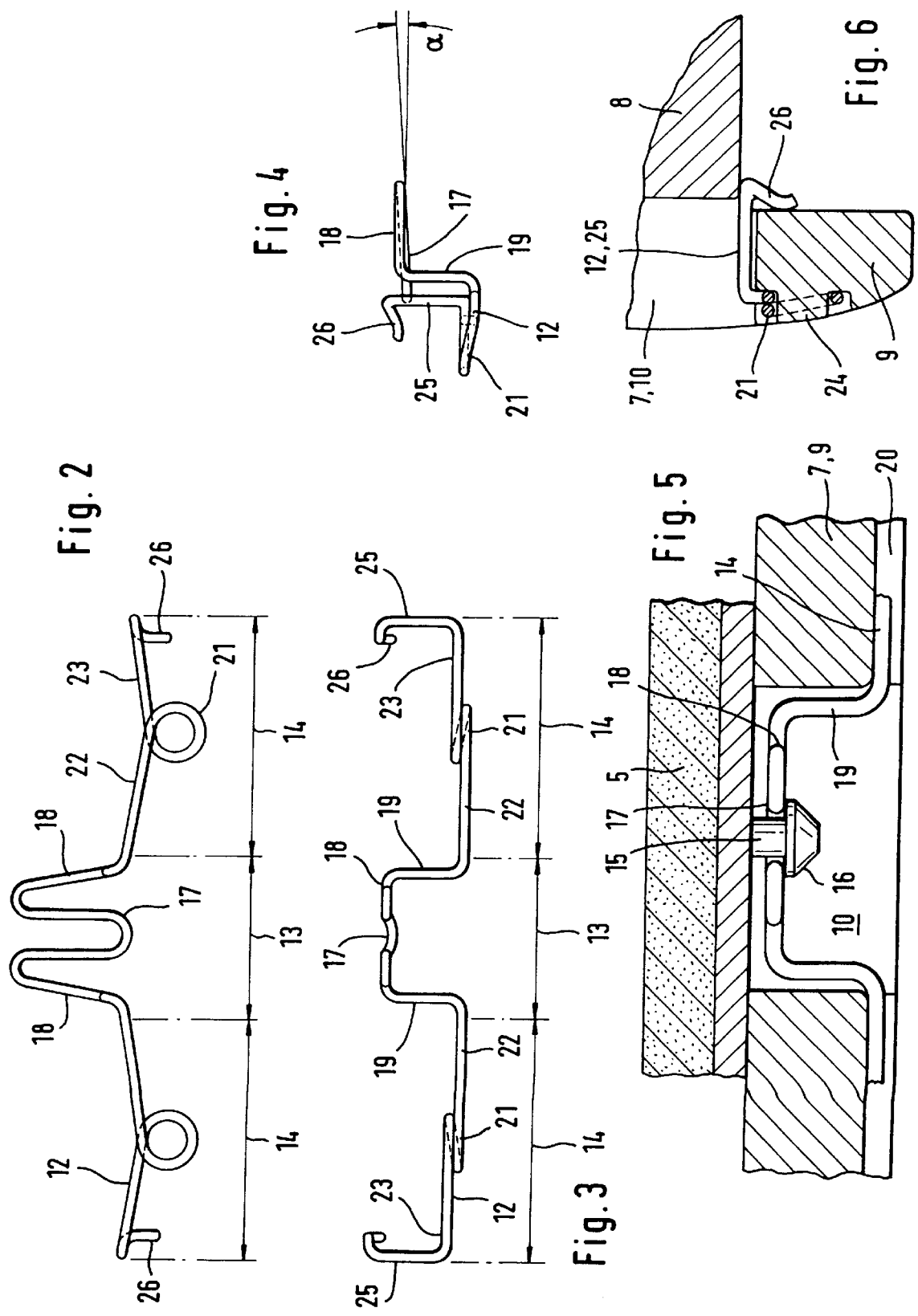

SPRING ASSEMBLY FOR A FLOATING CALLIPER DISC BRAKE

TECHNICAL FIELD

This invention generally relates to disc brakes and more particularly relates to a spring configuration for a floating-caliper disc brake.

BACKGROUND OF THE INVENTION

A spring configuration of a floating-caliper disc brake is known from DE 33 36 302 A1 where the floating caliper is a fist-type caliper without frame. A retaining spring bent in one piece from wire is riveted to the back side of the axially outer brake pad and is moreover secured against twisting in the plane of the brake disc. Two free spring arms support themselves axially on the outside of the fist leg and secure with bias the brake pad axially relative to the fist leg. One sole spring arm designed as parallel spring extends tangentially towards one side and supports itself on a carrier arm of the brake carrier in order to secure with bias the brake pad radially relative to the brake carrier. The radial securing with bias of the fist-type caliper relative to the brake carrier is done indirectly in that the outer brake pad is coupled to the fist leg of the fist-type caliper by means of a catch.

Regardless of the fact that such a spring configuration cannot be used with a floating-caliper disc brake with a fist-and-frame-type caliper there are further disadvantages. The fact that there is provided but one sole spring arm for the radial securing with bias involves the introduction of a torque into the brake pad in the plane of the brake disc whereby the brake pad located on the side opposite the sole spring arm tends to lift off from the carrier arm of the brake carrier. Efficient control of clattering noises will thus not be achievable. Moreover, the retaining spring is undetachably connected to the brake pad and will therefore have to be exchanged together with the worn brake pad.

Another spring configuration of a floating-caliper disc brake with a fist-type caliper without frame is known from DE 43 31 633 A1. A retaining spring bent in one piece from wire is detachably connected with the axially outer brake pad and secures with bias the brake pad radially relative to the brake carrier by means of two lateral spring arms. The fist-type caliper is also indirectly secured with bias relative to the brake carrier thanks to the fact that the brake pad is coupled with the fist leg of the fist-type caliper via two axially projecting catches. Projecting on the back side of the carrier plate of the brake pad are two notched nails disposed at a certain distance on top of each other which receive a lozenged looping formed in the central area of the retaining spring. For assembly and disassembly, the retaining spring must be twisted by 90 degrees in the plane of the brake disc so that the retaining spring can be moved over the heads of the notched nails thanks to the bigger distance between the respective corners of the lozenged looping of the retaining spring. Regardless of the fact that it does not become evident from DE 43 31 633 A1 whether or not the spring configuration also secures with bias the outer brake pad axially relative to the outer floating-caliper leg, this spring configuration cannot be used with a type of floating-caliper disc brakes equipped with a fist-and-frame-type caliper.

It is an object of this invention to provide a suitable spring configuration for a floating-caliper disc brake equipped with a fist-and-frame-type caliper.

The spring configuration of the present invention provides a retaining spring which is bent in one piece from wire and which includes a central section, detachably connected with the axially outer brake pad, and two spring arms essentially projecting from the central section in opposite tangential directions and which both secure with bias the fist-and-frame-type caliper radially relative to the brake carrier and secure with bias the axially outer brake pad axially relative to the inside of the outer fist-and-frame-type-caliper leg. Such a spring configuration is particularly suited for a floating-caliper disc brake with a fist-and-frame-type caliper In a preferred embodiment, a spring configuration is disclosed which is beneficial for a floating-caliper disc brake with a fist-and-frame-type caliper which, in the central area of its axially outer fist-and-frame-type-caliper leg, comprises a leg window and which, on both sides of this leg window, comprises apertures for an axial carrier arm each of the brake carrier stationarily connected with the chassis and which features a symmetrical design, particularly so with regard to a central plane extending transversely to the brake disc. In this embodiment the central section of the retaining spring is provided to be arranged essentially within the leg window of the outer fist-and-frame-type-caliper leg and the two spring arms of the retaining spring are provided to be disposed essentially on the outside of the outer fist-and-frame-type-caliper leg and each to reach with their outer end sections axially through the apertures provided in the fist-and-frame-type caliper for the carrier arms of the brake carrier and moreover to support themselves slidingly with radial bias on the undersides of the carrier arms of the brake carrier.

An advantageous embodiment of the spring configuration is disclosed having an easily manufactureable detachable connection of the retaining spring with the outer brake pad and the latter's axial pull support against the inside of the fist-and-frame-type-caliper leg. To this end, the central section of the retaining spring comprises a central part which is bent like a hairpin and the legs of which reach behind an enlarged, preferably axially outwards tapering head of a pin disposed on the outer brake pad and axially projecting therefrom into the leg window. Moreover, via corresponding connecting sections, the central part of the retaining spring is connected under axial tensile stress with a spring arm each of the retaining spring which axially support themselves on the outer fist-and-frame-type-caliper leg. To produce this detachable connection between the retaining spring and the brake pad, the central part of the retaining spring which is bent like a hairpin will just be slid with its open side in the radial direction onto the pin and engage the head from behind. An axially tapering shape of the head also enables another kind of assembly, with the hairpin-shaped central part axially being snapped onto the pin of the brake pad and with the legs of this hairpin-shaped central part temporarily being resiliently straddled apart.

An embodiment of the spring configuration is disclosed which provides the two legs of the hairpin-shaped central part each to pass over into a second leg bent like a hairpin into the opposite direction which passes over into an outer spring arm of the retaining spring by way of an essentially axially extending portion. This design enhances the elasticity of the central section of the retaining spring both in the tangential and axial directions, thereby facilitating both assembly and disassembly of the retaining spring.

Another variant of the spring configuration is disclosed which aims at a further facilitation with regard to the assembly of the retaining spring and permits a simpler configuration of the retaining spring. Here, the central section of the retaining spring is provided to have a tangentially extending central part whence, on both sides, a leg extends against the radial direction, with these two legs again each passing over into the spring arms of the retaining spring via an essentially axially extending portion. The two axial portions are designed so as to support themselves each with a section, preferably punctually, on the bottom side of the leg window and thus are connected with the spring arms of the retaining spring so that there is a tilting moment in the central section of the retaining spring which will pull the central part of the retaining spring outwards.

Also disclosed is an embodiment which provides the tangential central part of the central section of the retaining spring to be hung up behind a metal tongue which is fastened to the back side of the outer brake pad and is open preferably downwards, opening with a step-like expanded section. When mounting the retaining spring, in this case, the central tangential part of the retaining spring is inserted from below and disposed behind the metal tongue, with the retaining spring being swiveled around its longitudinal axis so that it supports itself with the respective sections on the bottom side of the leg window while simultaneously its tangential central part is moved in the radial direction on the back side of the metal tongue. The step-like expanded section of the metal tongue facilitates the assembly of the retaining spring in that it provides the retaining spring with a temporary support in a suitable intermediate position during its assembly.

An additional embodiment enables the retaining spring to be given a shape as simple as possible while its function is fully ensured although the predetermined geometrical conditions are relatively complicated due to the special type of a floating caliper. It is provided that the two spring arms of the retaining spring each support themselves in their central area against the radial direction and with their inner spring leg, which points to the central section, in the radial direction on an axial projection or recess provided on the frame of the fist-and-frame-type caliper.

Again, there are two beneficial variants in this respect. One embodiment provides that the central areas of the two spring arms of the retaining spring each are designed as spiral looping and each are supported on a cylindrical axially projecting pin disposed on the frame of the fist-and-frame-type caliper and that the inner spring legs of the two spring arms of the retaining spring support themselves on the upper side of an axially open groove-like recess in the frame of the fist-and-frame-type caliper. This design ensures a very reliable fitting of the retaining spring. On the other hand, it requires the existence of axially projecting pins on the frame of the fist-and-frame-type caliper which may be a disadvantage if the constructional space available in the axial direction is but of minimum size.

In a preferred design the central areas of the two spring arms of the retaining spring are designed as vertices pointing against the radial direction and being the vertices of two spring legs extending at an obtuse angle in respect of each other which support themselves on the bottom side, i.e. on the side pointing in the radial direction, of an axially open groove-like recess of the frame of the fist-and-frame-type caliper. Simultaneously, the respective inner spring legs of the two spring arms each support themselves on the upper side of this groove-like recess, i.e. on the side of the groove-like recess which points against the radial direction. The particular advantage of this design is that it needs less constructional space in the axial direction of the disc brake and that, moreover, the shape of the retaining spring is less complicated and thus easier to manufacture.

To ensure a reliable locking of the retaining spring in the axial direction of the disc brake in all situations an embodiment is disclosed wherein the free ends of the retaining spring which adjoin the outer end sections of the spring arms which reach through the apertures of the fist-type frame are bent so that they engage the inside of the frame of the fist-and-frame-type caliper from behind, thus locking the retaining spring axially on the fist-and-frame-type caliper.

BRIEF DESCRIPTION OF THE DRAWINGS

FIG. 2 is a view of a retaining spring;

FIG. 3 is a top view of the retaining spring of FIG. 2;

FIG. 4 is a side view of the retaining spring of FIG. 3;

FIG. 5 is a detail of an embodiment of a detachable connection of brake pad and retaining spring;

FIG. 6 is sectional representation of a detail of the spring configuration of FIG. 1;

DETAILED DESCRIPTION OF THE PREFERRED EMBODIMENTS

Figure 1:
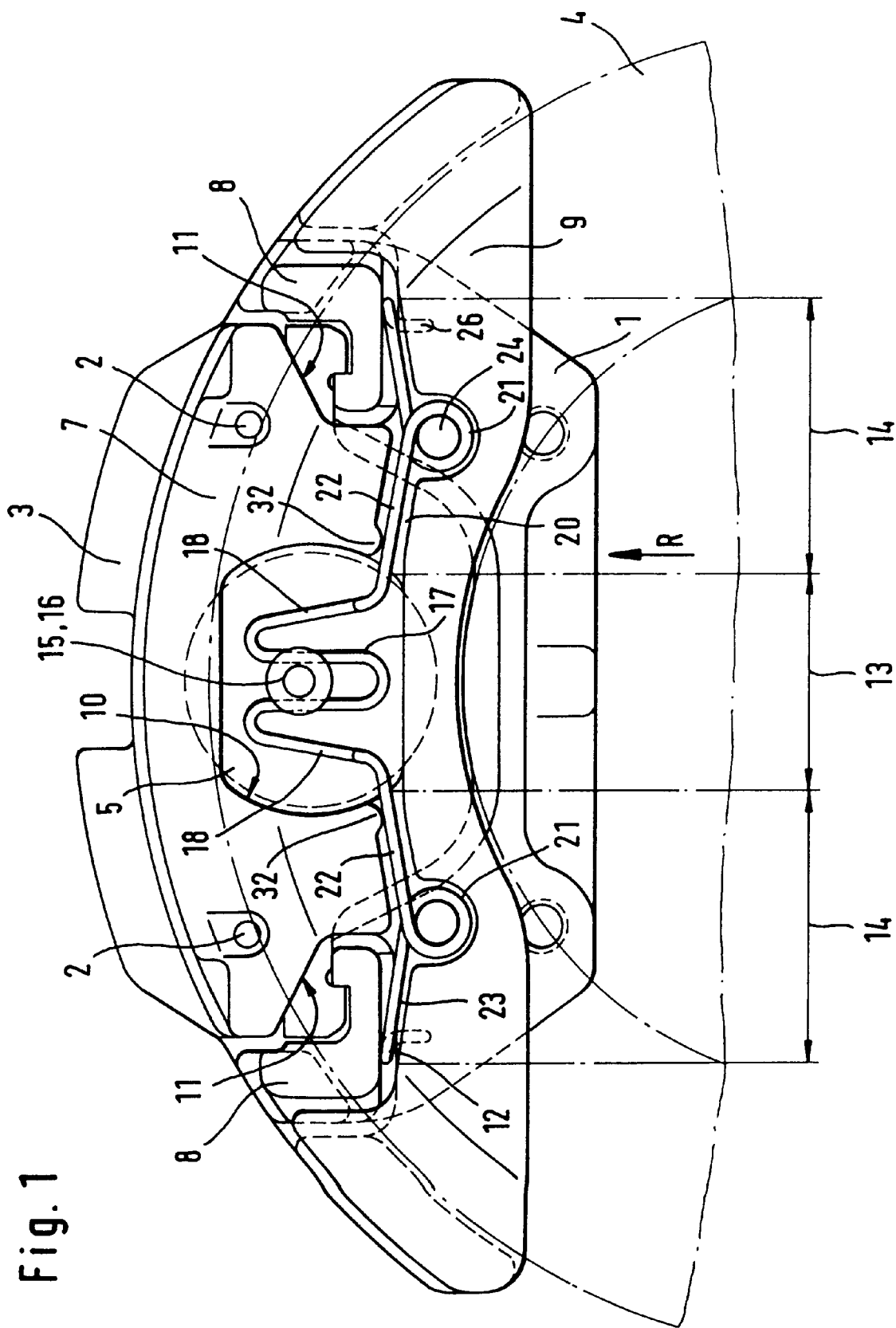
FIG. 1 is a view of a spring configuration for a floating-caliper disc brake with a fist-and-frame-type caliper.
Figure 7:
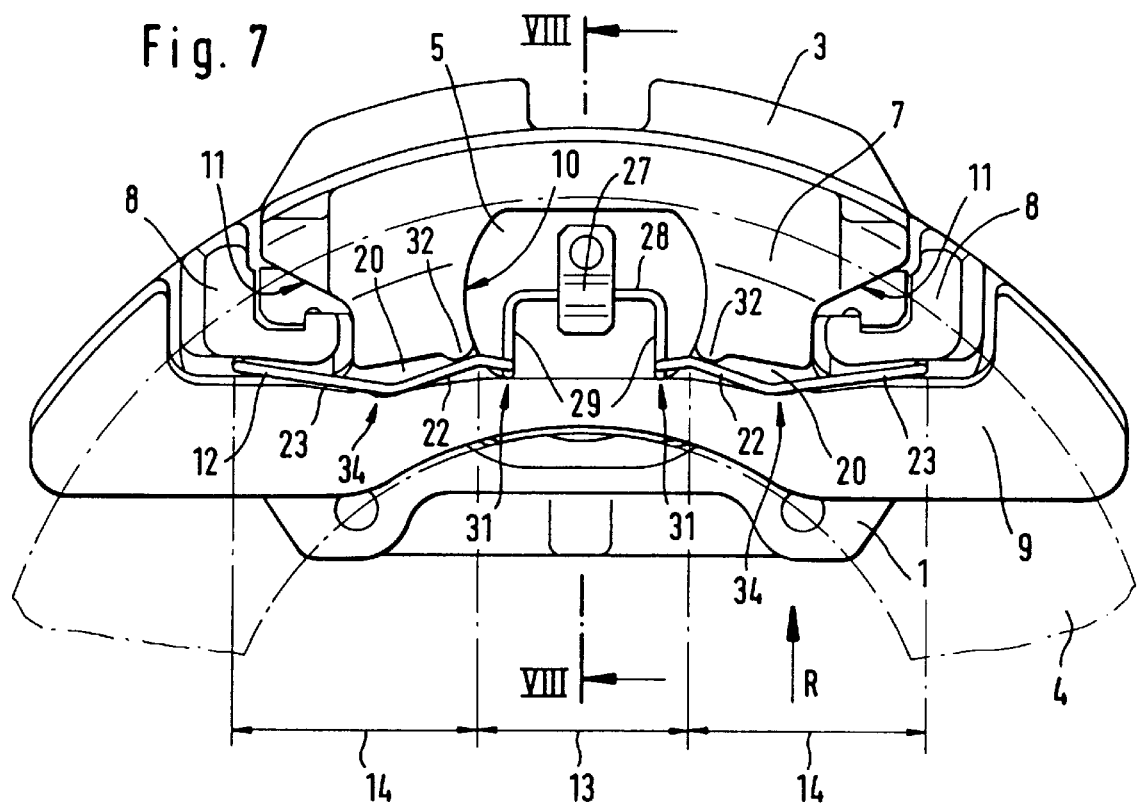
FIG. 7 is a view of another embodiment of a spring configuration for a floating-caliper disc brake with a fist-and-frame-type caliper.
Figure 8:
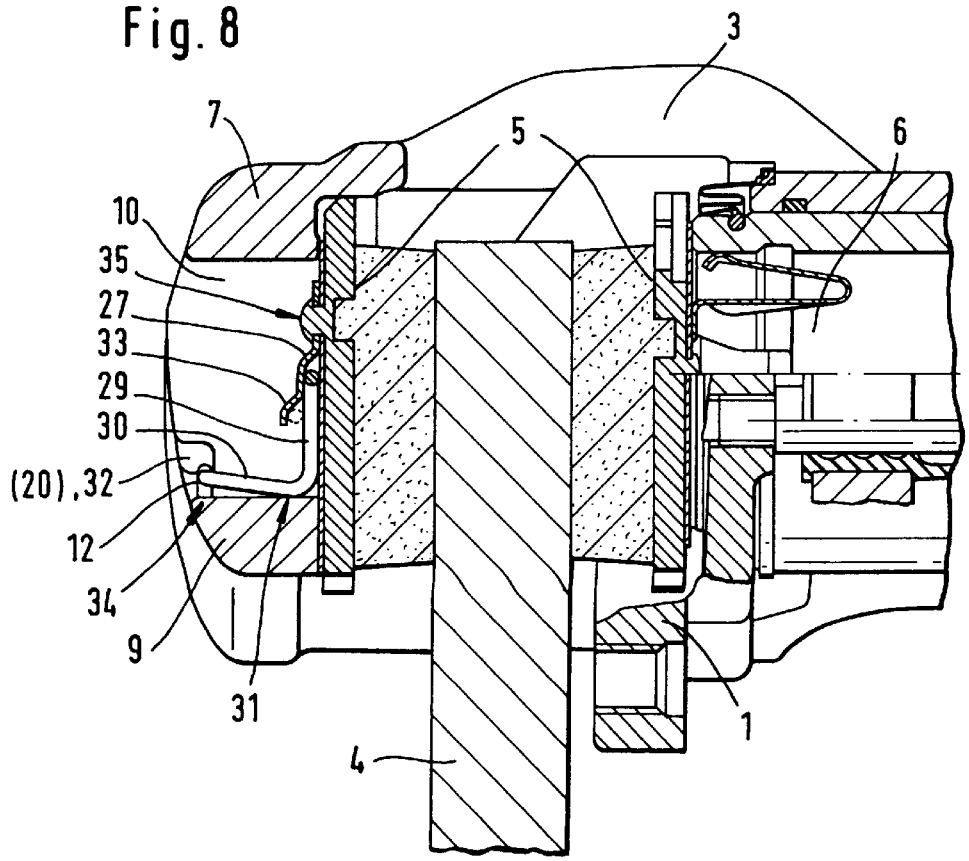
FIG. 8 is a perpendicular cross-section along line VIII—VIII of FIG. 7.

The floating-caliper disc brakes represented in FIG. 1 as well as in FIGS. 7 and 8 comprise a brake carrier 1 which is to be fastened to the vehicle so as to be stationarily connected with the chassis and whereon, by means of two bolt guides 2, a floating caliper having the design of a fist-and-frame-type caliper 3 is supported axially displaceably. The fist-and-frame-type caliper 3 straddles the brake disc 4 and receives two brake pads 5 composed of friction lining and backing plate. Out of these brake pads 5, the inner brake pad is directly applicable to the brake disc 4 via a hydraulic actuating device 6 while the outer brake pad is applicable to the brake disc 4 indirectly via the outer fist-and-frame-type-caliper leg 7 of the fist-and-frame-type caliper 3. The brake pads are axially displaceably supported and guided in carrier arms 8 of the brake carrier 1 which axially reach across the brake disc 4. The fist-and-frame-type caliper 3 is characterized in that it has a frame 9 to enhance its stability and torsional strength. The frame 9 surrounds the lower edge of the fist-type caliper like a frame and is connected therewith. The fist-and-frame-type caliper 3 is designed so that there are disposed a leg window 10 centrically in the axially outer fist-and-frame-type-caliper leg 7 and, on either side of this leg window 10, an aperture 11 each for the carrier arms 8 of the brake carrier 1.

The inventive spring configuration further comprises a retaining spring 12 essentially extending parallel to the brake disc 4. This retaining spring 12 has a central section 13 essentially arranged within the leg window 10 and detachably connected with the axially outer brake pad 5. The central section 13 of the retaining spring 12 is adjoined by the two spring arms 14 which, each proceeding from the central section 13, extend in opposite tangential directions. The spring configuration, with the retaining spring 12 being the essential component thereof, is designed so that both the outer brake pad 5 is secured with bias in the axial direction relative to the inside of the outer fist-and-frame-type-caliper leg and the fist-and-frame-type caliper 3 is secured with bias against the radial direction R relative to the brake carrier 1 and the axial carrier arms 8 thereof in order to essentially avoid clattering noises of the disc brakes during operation of the vehicle.

A first embodiment of a spring configuration results from FIGS. 1 through 6. The retaining spring 12 is arranged essentially parallel to the brake disc 4. Like the entire disc brake it is symmetrically constructed with respect to a central plane running transversely to the brake disc. The central section 13 of the retaining spring 12 is essentially arranged within the leg window 10 of the fist-and-frame-type caliper 3 and is moreover detachably connected with the backing plate of the axially outer brake pad 5. To this end, a pin 15 is disposed on the backing plate of the brake pad 5. This pin 15 projects axially into the leg window 10 and includes an enlarged head 16 at its free end. This head is designed so as to taper conically towards the free end. This pin 15 with head 16 may be formed by an axial bulge of the material of the backing plate of the brake pad 5 or, also, by a notched nail disposed in the backing plate of the brake pad 5.

On the other hand, the central section 13 of the retaining spring 12 has a central part 17 shaped like a hairpin. The legs of this central part extend in the radial direction R and are open in this direction R. The legs of the hairpin-shaped central part 17 receive the pin 15 between them and engage the head 16 of this pin 15 from behind to thus form an easy-to-achieve detachable connection. This detachable connection is simply brought about by pressing the hairpin-shaped central part 17 in the axial direction onto the conically tapering head 16 of the pin 15 so that the legs of the hairpin-shaped central part 17 slide onto the conical head 16 and are temporarily straddled apart in the way of an elastic spring until they snap over the head 16 and, behind the same, back into their initial position, receiving the pin 15 between them. The enlarged head 16 thus forms a stop for the central part 17 of the retaining spring 12 in the axial direction. The elasticity of the central section 13 of the retaining spring is increased in the tangential direction of the brake disc 4 in order to ensure that the forces required for straddling the hairpin-shaped central part 17 apart will not be excessive. This increase in elasticity is achieved in that the ends of the two legs of the hairpin-shaped central part 17 each pass over into a second leg 18 by means of a further hairpin bend running against the radial direction R. Each of the second legs 18 essentially extends against the radial direction R and is adjoined by an axially extending portion 19 of the retaining spring 12 which leads up to the outside of the outer fist-and-frame-type-caliper leg 7 and is connected there with a spring arm 14.

A major part of the spring arms 14 which, proceeding from the central section 13, each extend in opposite tangential directions is disposed in a groove-like recess 20 which is worked into the frame 9 of the fist-and-frame-type caliper 3 and which is open axially outwards. The two spring arms 14 support themselves in the axial direction on the bottom of this groove-like recess 20. As can be seen from FIG. 4, in the relaxed state of the retaining spring 12, the hairpin-shaped central part 17 is bent axially outwards relative to the second legs 18 by an acute angle a of approximately 5 degrees in order to secure with bias the outer brake pad 5 axially on the inside of the fist-and-frame-type-caliper leg 7. This will ensure that the legs of the hairpin-shaped central part 17 reach behind the head 16 of the pin 15, disposed on the brake pad 5, with axial tensile stress.

It can also be noticed that, in their central area, the spring arms 14 each comprise a spiral looping 21 whereby each time an inner spring leg 22 and an outer spring leg 23 are formed, with the inner spring legs 22 being connected with the axially extending portions 19 of the central section 13. The inner spring legs 22 and outer spring legs 23 connected with each other via the looping 21 each time form a torsion spring supported with the looping 21 on a cylindrical pin 24. The cylindrical pins 24 are disposed within the groove-like recess 20 and project axially outwards from the bottom of the groove-like recess 20. These cylindrical pins 24 are advantageously manufactured by casting and thus are an integral component of the frame 9 or rather of the fist-and-frame-type caliper 3.

The inner spring legs 22 of the spring arms 14 are disposed in the groove 20 of the frame 9 and support themselves in the radial direction R on the upper side of the groove 20. Knob-like projections 25 are integrally formed on the upper side of the groove 20 in the area where the groove 20 passes over into the leg window 10 so as to achieve a punctiform support of the inner spring legs 22. These projections project into the groove 20 against the radial direction R. The end sections of the spring arms 14 or rather of the outer spring legs 23 are bent axially inwards and each reach through an aperture 11 in the fist-and-frame-type caliper 3 in order to support themselves with appropriate spring elasticity in the radial direction R on the undersides of the carrier arms 8 of the brake carrier 1. This secures with bias the fist-and-frame-type caliper 3 evenly radially relative to the brake carrier 1 without any torque being introduced into the brake pad 5 in the plane of the brake disc 4 as in the case of a known spring configuration with but one lateral spring arm. Besides, assembling the spring is made easier, for each of the two spring arms 14 has to generate only half of the total elastic force required for the proper securing with bias of the fist-and-frame-type caliper 3 relative to the brake carrier 1.

The retaining spring 12 of this first example of an embodiment of a spring configuration is also equipped with an additional means for locking the retaining spring 12 on the frame 9 of the fist-and-frame-type caliper 3 in the axial direction. This means consists in that the free ends 26 of the spring arms 14 or rather of the outer spring legs 23 which adjoin each time the end section 25 are bent so that they reach behind the inside of the frame 9 of the fist-and-frame-type caliper 3. To achieve that the retaining spring 12 is reliably locked in the axial direction, the free ends 26 are in part obliquely directed axially outwards in order to achieve that the retaining spring is axially secured with bias on the frame 9 of the fist-and-frame-type caliper 3. This additional locking of the retaining spring 12 is of particular importance if for space reasons the cylindrical pins 24 whereon the loopings 21 of the spring arms 14 are supported only can have a relatively small axial extension. This additional axial locking by means of the bent free ends 26 will prevent the loopings 21 of the retaining spring 21 from snapping off from the cylindrical pins 24 under respective stress conditions. The last-mentioned complex becomes particularly clear in FIG. 6. FIG. 6 also reveals how retaining spring 12 supports itself with its end section 25 slidingly on the underside of the carrier arm 8 of the brake carrier 1.

Another example of an embodiment of a spring configuration for a fist-and-frame-type caliper disc brake is revealed by FIGS. 7 and 8. Again, a retaining spring 12 is an essential component of this spring configuration. Retaining spring 12 comprises a central section 13 essentially disposed within the leg window 10 of the fist-and-frame-type-caliper leg 7. From this central section 13, there extends a spring arm 14 each in opposite tangential directions. Riveted to the backing plate of the outer brake pad 5 is a metal tongue 27 which is open against the radial direction R and moreover projects axially into the leg window 10. The central section 13 of the retaining spring 12 comprises a straight central part 28 which extends tangentially and reaches behind the metal tongue 27 fastened on the brake pad 5. From the two ends of the tangential central part 28 there extends a leg 29 each parallel to the brake disc 4 and against radial direction R. These legs 29 each pass over into an essentially extending portion 30. These axial portions 30, again, are connected with the two spring arms 14 of the retaining spring 12.

The central section 13 of the retaining spring 12 is designed to ensure that a tilting moment will pull the tangential central part 28 axially outwards in order to secure the outer brake pad 5 with axial tensile stress relative to the inside of the fist-and-frame-type-caliper leg 7. To achieve this the two essentially tangentially extending legs 29 each support themselves on a supporting point 31 on the bottom of the leg window 10. As, moreover, the legs 30 do not extend parallel to the bottom of the leg window 10 but slightly ascend, proceeding from the supporting point 31, it becomes possible to bias the central section 13 so as to ensure that a permanent tilting moment will pull the tangential central part 28 axially outwards. This biased condition of the central section 13 will be achieved in that the spring arms 14 each support themselves in the area of the inner spring legs 22 against the radial direction R on the upper side of the axially open, groove-like recess 20 in the frame 9 of the fist-and-frame-type caliper 3, particularly on the knob-like projections 32 projecting from above into the groove-like recess 20. Further, the two spring arms 14 support themselves axially on the outside of the fist-and-frame-type-caliper leg 7 and, thus, on the bottom of the groove-like recess 20.

FIG. 8 also reveals that the metal tongue 27 comprises a section 33 which, step-like, expands downwards. This step-like section 33 facilitates the assembly of the retaining spring 12 in that it at first is hung up in this step-like section 33 and thus already will reliably be held in a temporary intermediate position before it reaches its final position.

From FIG. 7 it can be seen that the two spring arms 14 of the retaining spring 12 ensure an even radial securing with bias of the fist-and-frame-type caliper 3 on the brake carrier 1 without introducing any troublesome torque into the brake pad 5. The spring arms 14, again, each have an inner spring leg 22 and an outer spring leg 23 connected with each other at an obtuse angle in a vertex 34. The vertices 34 of the spring arms 14 each support themselves on the bottom side of the groove-like recess 20 against the radial direction R while, in the radial direction R, the inner ends of the inner spring legs 22 support themselves on the knob-like projections 32 projecting from above into the groove-like recess 20.

Further, the retaining spring 12 of this embodiment is designed towards its ends in the same way as the retaining spring 12 of the embodiment represented in FIGS. 1 through 6. This means that, on each of its outer spring legs 23, the retaining spring 12 comprises end sections 25 which are bent in the axial direction and, as shown in FIG. 6, reach through the apertures 11 and support themselves slidingly in the radial direction R on the underside of the carrier arms 8 of the brake carrier 1. Moreover, as likewise shown in FIG. 6, the free ends 26 of the retaining spring 12 are bent so as to reach behind the inside of the frame 9 of the fist-and-frame-type caliper 3, thus reliably securing with bias the retaining spring 12 in the axial direction on the frame 9 of the fist-and-frame-type caliper 3.

Further, it can be seen from FIG. 8 that the rivet pin 35 whereon the metal tongue 27 is riveted is advantageously made from a bulge of the material of the backing plate of the brake pad 5.

LIST OF REFERENCE NUMERALS

1 brake carrier
2 bolt guide
3 fist-and-frame-type caliper
4 brake disc
5 brake pad
6 hydraulic actuating device
7 fist-and-frame-type-caliper leg
8 carrier arm
9 frame
10 leg window
11 aperture
12 retaining spring
13 central section
14 spring arm
15 pin
16 head
17 central part
18 second leg
19 portion
20 groove-like recess
21 looping
22 inner spring leg
23 outer spring leg
24 cylindrical pin
25 end section
26 free end
27 metal tongue
28 central part
29 leg
30 portion
31 supporting point
32 projection
33 section
34 vertex
35 rivet pin
α angle
R radial direction

What is claimed is:

1. A spring configuration for a floating-caliper disc brake with a fist-and-frame-type caliper which, in the central area of its axially outer fist-and-frame-type-caliper leg, comprises a leg window and apertures provided on both sides of this leg window for an axial carrier arm each of a brake carrier stationarily connected to the chassis and which is supported axially displaceably on the brake carrier, with brake pads being supported axially displaceably on the carrier arms of the brake carrier on both sides of the brake disc and moreover being straddled by the fist-and-frame-type caliper, comprising:

a retaining spring which includes a central section, detachably connected with the axially outer brake pad, and two spring arms projecting from the central section in opposite tangential directions wherein, said two spring arms secure the fist-and-frame-type caliper radially relative to the brake carrier and secure the axially outer brake pad axially relative to the inside of the outer fist-and-frame-type-caliper leg wherein the central section of the retaining spring has a central part which is bent in the shape of a hairpin and the legs of which reach behind an enlarged, axially tapering head of a pin disposed on the outer brake pad and axially projecting therefrom into the leg window and in that the central part is connected with axial tensile stress with a spring arm each spring arm supporting themselves axially on the outer fist-and-frame-type-caliper leg wherein the two legs of the hairpin-shaped central part each pass over into a second leg which is bent like a hairpin in the opposite direction and which passes over into a spring arm of the retaining spring via an axially extending portion.

2. A spring configuration as claimed in claim 1, wherein the central section of the retaining spring has a tangentially extending central part whence, on both sides, a leg extends against the radial direction which legs again pass over into the spring arms of the retaining spring via an essentially axially extending portion and in that the two axial portions each support themselves with a section, on the bottom side of the leg window and are connected with the spring arms of the retaining spring so that there is an outwards pulling tilting moment in the central section of the retaining spring.

3. A spring configuration as claimed in claim 2, wherein the tangential central part of the central section of the retaining spring is hung up behind a metal tongue which is fastened to the back side of the outer brake pad and is open preferably downwards, opening with a step-like expanded section.

4. A spring configuration as claimed in claim 1, wherein the two spring arms of the retaining spring support themselves each in their central areas against the radial direction and with their inner spring legs, which point to the central section, in the radial direction on an axial projection or recess provided on the frame of the fist-and-frame-type caliper.

5. A spring configuration as claimed in claim 4, wherein the central areas of the two spring arms of the retaining spring are formed as spiral and each are supported on a cylindrical axially projecting pin of the frame and in that the inner spring legs of the two spring arms of the retaining spring support themselves on the upper side of an axially open groovelike recess of the frame.

6. A spring configuration as claimed in claim 4, wherein the central areas of the two spring arms of the retaining spring are designed as vertices pointing against the radial direction and being the vertices of the inner and outer spring legs extending at an obtuse angle relative to each other and support themselves on the bottom side of an axially open groove-like recess of the frame while the respective inner spring legs of the spring arms each support themselves on the upper side of this groove-like recess.

7. A spring configuration as claimed in claim 1, wherein the free ends of the retaining spring which adjoin the outer end sections of the spring arms which reach through the apertures of the fist-and-frame-type caliper are bent so that they reach behind the inside of the frame of the fist-and-frame-type caliper and lock the retaining spring axially on the fist-and-frame-type caliper.

8. A spring configuration for a floating-caliper disc brake with a fist-and-frame-type caliper which, in the central area of its axially outer fist-and-frame-type-caliper leg, comprises a leg window and apertures provided on both sides of this leg window for an axial carrier arm each of a brake carrier stationarily connected to the chassis and which is supported axially displaceably on the brake carrier, with brake pads being supported axially displaceably on the carrier arms of the brake carrier on both sides of the brake disc and moreover being straddled by the fist-and-frame-type caliper, comprising:

a retaining spring which is bent in one piece from wire and which includes a central section, detachably connected with the axially outer brake pad, and two spring arms essentially projecting from the central section in opposite tangential directions wherein, said two spring arms secure the fist-and-frame-type caliper radially relative to the brake carrier and secures with bias the axially outer brake pad axially relative to the inside of the outer fist-and-frame-type-caliper leg, wherein the central areas of the two spring arms of the retaining spring are formed as spiral looping and each are supported on a cylindrical axially projecting pin of the frame and in that the inner spring legs of the two spring arms of the retaining spring support themselves on the upper side of an axially open groove-like recess of the frame.

9. A spring configuration for a floating-caliper disc brake with a fist-and-frame-type caliper which, in the central area of its axially outer fist-and-frame-type-caliper leg, comprises a leg window and apertures provided on both sides of this leg window for an axial carrier arm each of a brake carrier stationarily connected to the chassis and which is supported axially displaceably on the brake carrier, with brake pads being supported axially displaceably on the carrier arms of the brake carrier on both sides of the brake disc and moreover being straddled by the fist-and-frame-type caliper, comprising:

a retaining spring which is bent in one piece from wire and which includes a central section, detachably connected with the axially outer brake pad, and two spring arms essentially projecting from the central section in opposite tangential directions both secures with bias the fist-and-frame-type caliper radially relative to the brake carrier and secures with bias the axially outer brake pad axially relative to the inside of the outer fist-and-frame-type-caliper leg wherein the central areas of the two spring arms of the retaining spring are designed as vertices pointing against the radial direction and being the vertices of the inner and outer spring legs extending at an obtuse angle relative to each other and support themselves on the bottom side of an axially open groove-like recess of the frame while the respective inner spring legs of the spring arms each support themselves on the upper side of this groove-like recess.

* * * * *